(12) United States Patent
Fourre et al.

(10) Patent No.: US 12,321,430 B2
(45) Date of Patent: Jun. 3, 2025

(54) METHOD AND DEVICE FOR BIOMETRIC IDENTIFICATION AND/OR AUTHENTICATION

(71) Applicant: IDEMIA IDENTITY & SECURITY FRANCE, Courbevoie (FR)

(72) Inventors: Joël-Yann Fourre, Courbevoie (FR); Jean Beaudet, Courbevoie (FR); Alain Thiebot, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 329 days.

(21) Appl. No.: 17/804,736

(22) Filed: May 31, 2022

(65) Prior Publication Data

US 2022/0391483 A1 Dec. 8, 2022

(30) Foreign Application Priority Data

Jun. 2, 2021 (FR) ........................................ 2105798

(51) Int. Cl.
*G06F 21/32* (2013.01)
*G06V 40/12* (2022.01)
(52) U.S. Cl.
CPC .......... *G06F 21/32* (2013.01); *G06V 40/1371* (2022.01); *G06V 40/1388* (2022.01)
(58) Field of Classification Search
CPC ............... G06F 21/32; G06V 40/1371; G06V 40/1388; G06V 10/46; G06V 10/761; G06V 10/82; G06V 40/1353; G06V 40/171; G06V 40/172; G06V 40/193; G06V 40/197; G06V 40/40; G06V 40/1318; G06V 40/1347; G06V 40/1365; H04L 63/0861
See application file for complete search history.

(56) References Cited

U.S. PATENT DOCUMENTS

2006/0078177 A1* 4/2006 Niinuma .............. G06V 10/809
382/124
2013/0343642 A1* 12/2013 Kuo ....................... G06V 10/56
382/159
(Continued)

FOREIGN PATENT DOCUMENTS

| EP | 3287943 A1 | 2/2018 |
| FR | 3037422 B1 | 6/2017 |
| WO | 2014/198847 A1 | 12/2014 |

OTHER PUBLICATIONS

Preliminary Research Report received for French Application No. 2105798, mailed on Jan. 10, 2022, 3 pages (1 page of French Translation Cover Sheet and 2 pages of original document).

*Primary Examiner* — Farid Homayounmehr
*Assistant Examiner* — Mudasiru K Olaegbe
(74) *Attorney, Agent, or Firm* — WOMBLE BOND DICKINSON (US) LLP

(57) ABSTRACT

A method for biometric identification or authentication is described. An image of a body region is obtained. A truth map for said body region is obtained, said truth map associating, with each portion of a set of portions of said image of a body region, a probability that said portion belongs to a true body region. The image of the body region is then compared with a group of reference biometric data using the truth map. Finally, the identification or authentication of said body region is validated or invalidated in response to said comparison.

10 Claims, 4 Drawing Sheets

(56) References Cited

U.S. PATENT DOCUMENTS

| | | | |
|---|---|---|---|
| 2014/0016832 A1* | 1/2014 | Kong | A61B 5/0077 |
| | | | 382/115 |
| 2014/0025607 A1* | 1/2014 | Wang | G06F 16/9027 |
| | | | 706/12 |
| 2014/0079296 A1* | 3/2014 | Cleland | G06V 40/193 |
| | | | 382/117 |
| 2014/0079297 A1* | 3/2014 | Tadayon | G06V 40/172 |
| | | | 382/118 |
| 2014/0283113 A1* | 9/2014 | Hanna | G06V 40/70 |
| | | | 726/27 |
| 2016/0070967 A1 | 3/2016 | Du et al. | |
| 2016/0364611 A1 | 12/2016 | Krichen et al. | |
| 2019/0159712 A1* | 5/2019 | Marks | A61B 5/1176 |
| 2019/0251380 A1* | 8/2019 | Park | G06V 10/803 |
| 2022/0222474 A1* | 7/2022 | Hassani | G06V 20/64 |
| 2023/0088414 A1* | 3/2023 | Toni | G06V 20/53 |
| | | | 382/103 |
| 2023/0246839 A1* | 8/2023 | Mathieu | H04W 12/06 |

\* cited by examiner

[Fig. 1]
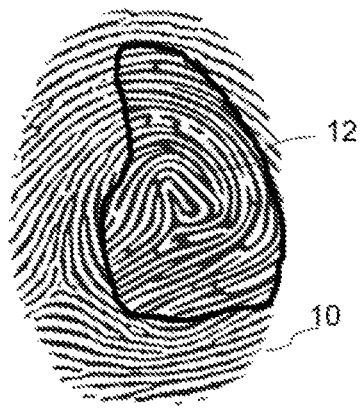
[Fig. 2]
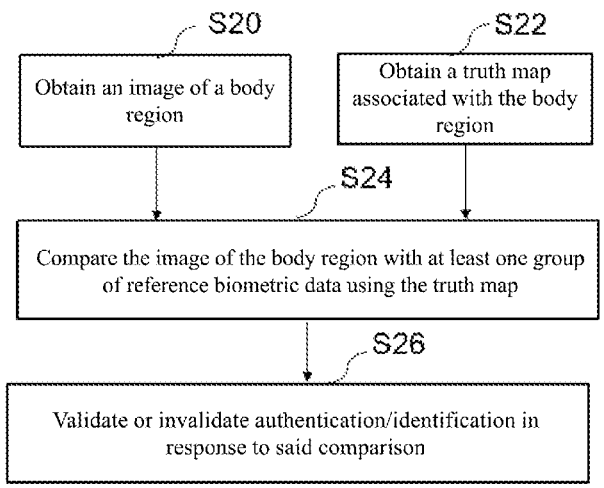

[Fig. 3]
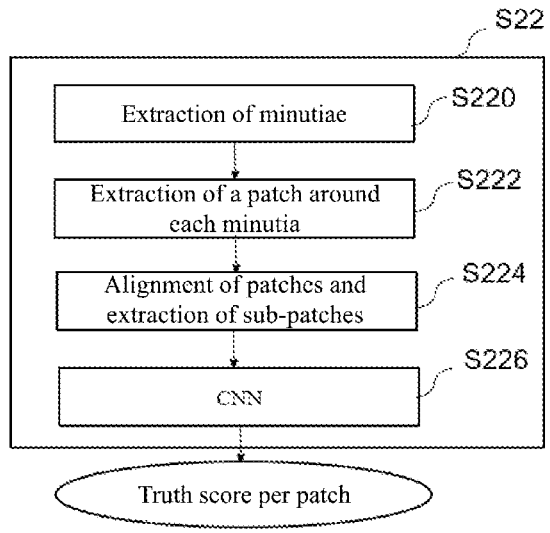
[Fig. 4]
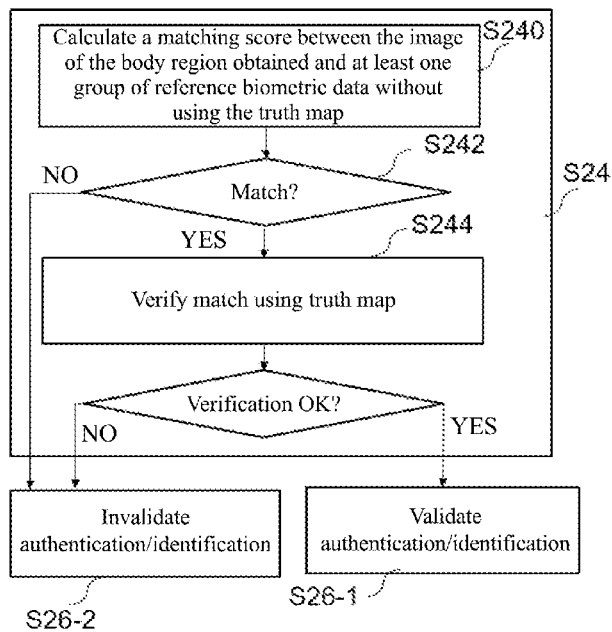

[Fig. 5]
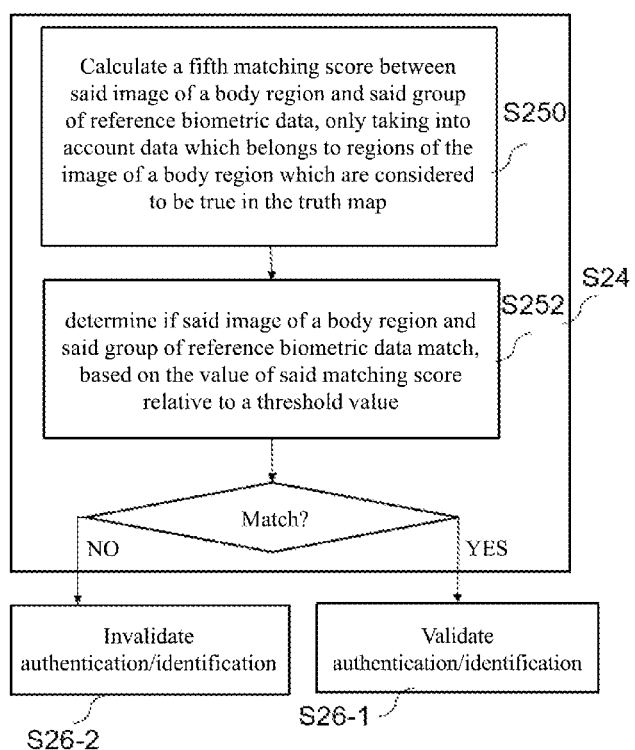

[Fig. 6]
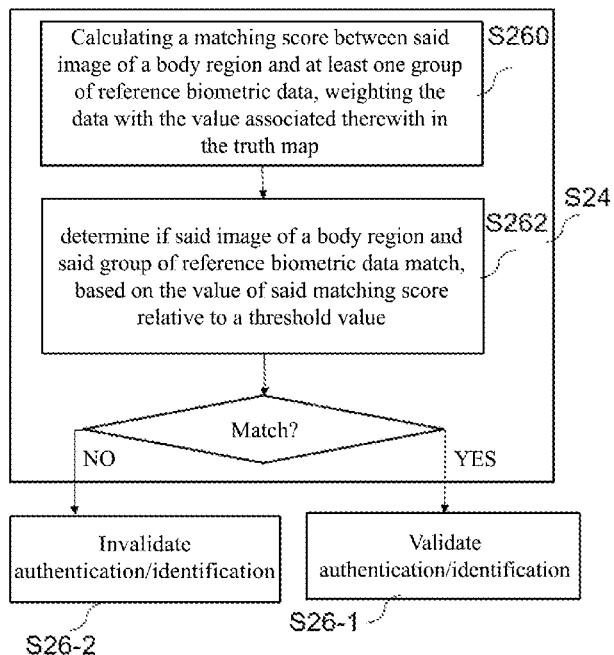
[Fig. 7]
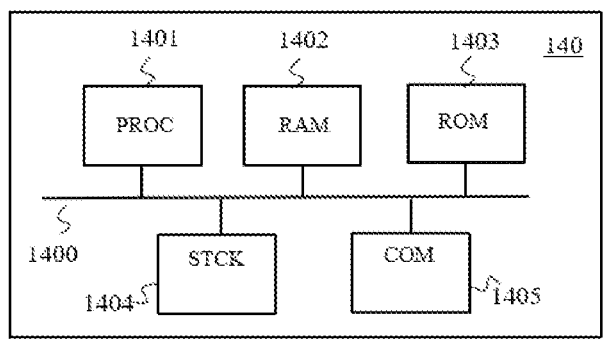

METHOD AND DEVICE FOR BIOMETRIC IDENTIFICATION AND/OR AUTHENTICATION

CROSS-REFERENCE TO RELATED APPLICATIONS

This application claims priority pursuant to 35 U.S.C. 119(a) to France Patent Application No. 2105798, filed Jun. 2, 2021, which application is incorporated herein by reference in its entirety.

TECHNICAL FIELD

The present invention relates to the field of detecting fraud in the field of biometric identification/authentication. At least one embodiment relates to a method for biometric identification and/or authentication, and also to a device implementing such a method.

PRIOR ART

Identifying a person by the biometric recognition of a face, a fingerprint or a palm print, an iris of an eye, makes it possible to secure access to buildings or machinery. Such technology makes it possible to dispense with access codes or cards which can be borrowed, stolen or falsified. Using this technology makes it possible to strengthen security, in so far as the probability that two people for example have identical fingerprints is virtually zero.

In the case of identification, biometric data extracted from an image of a body part (for example, local elements such as minutiae in the case of a fingerprint) is compared with a set of reference biometric data contained in a database in order to find the identity of a person from among several other people. In the case of authentication, this extracted biometric data are compared to biometric data from one and the same person in order to verify that the person presenting themselves is indeed who they claim to be. The comparison makes it possible to determine whether or not the captured image belongs to a person referenced in the database or whether the person is indeed who they claim to be.

Some ill-intentioned individuals attempt to have themselves fraudulently identified (or authenticated) using spoofs in order to mislead identification (or authentication) devices. Indeed, with the advent of 3D printers, it is possible to create false fingers or masks in different materials, fir example plastic, resin, etc. The application of paint and/or make up when makes it possible to produce a mask which is virtually identical to an actual face. Thus, it is known to validate that the body part present in front of a capture device is true. A body part is considered to be true if it is actually the body part it claims to be, and not a spoof. Thus, here, this involves validating the veracity of the body part captured, the image of which will serve for the biometric identification.

Some known validation methods are based entirely on analyzing images, particularly by identifying artifacts from carrying out frauds. However, these methods are not robust when confronted with careful frauds.

Other validation methods are known for capturing a series of images of the body part and for measuring physical parameters, for example, perspiration, pulse, oximetry, or the whitening which happens when a finger is pressed on a capture surface. The methods compare the physical parameters thus measured on the body part to thresholds in order to make a decision regarding the fraudulent nature of the identification/authentication. Such decision thresholds are difficult to regulate. This is because degradations (for example, surface degradation of the epidermis) can reduce the performance of the methods in question. Thus, the thresholds must be regulated so as to validate an identification/authentication if the true body part is degraded (for example, dirty, bruised, etc.). However, thresholds which are set to validate identification in such situations also tend to validate acquisitions combining a true body part and a fraudulent body part, which reduces the overall security of the system. On the other hand, if the thresholds are regulated to invalidate acquisitions combining a true body part and a fraudulent body part, they risk also invalidating the identification/authentication if a true body part is degraded.

Overcoming these disadvantages of the prior art is desirable. It is particularly desirable to propose a method for identification/authentication which is robust to attempted fraud while enabling identification/authentication in the case of degradations present on body parts which are considered to be true.

DISCLOSURE OF THE INVENTION

At least one embodiment relates to a method for biometric identification or authentication, comprising:
   obtaining an image of a body region;
   obtaining a truth map for said body region, said truth map associating, with each portion of a set of portions of said image of a body region, a value equal to a probability that said portion belongs to a true body region;
   comparing said image of a body region with a group of reference biometric data using said truth map;
   validating or invalidating the identification or the authentication of said body region in response to said comparison.

The described method advantageously enables identification/authentication of an individual, even if said individual has a body part with degradations, with this identification/authentication moreover being robust to attempted frauds, particularly those combining a true body part and a spoof.

In one embodiment, comparing said image of a body region with a group of reference biometric data using said truth map comprises:
   calculating a first matching score between said image of a body region and said group of reference biometric data, only taking into account data which belongs to regions of the image of a body region which are considered to be true in the truth map; and
   determining if said image of a body region and said group of reference biometric data match, based on the value of said first matching score relative to a first threshold value.

In one embodiment, comparing said image of a body region with a group of reference biometric data using said truth map comprises:
   calculating a second matching score between said image of a body region and said group of reference biometric data, weighting the data with the value associated therewith in the truth map;
   determining if said image of a body region and said group of reference biometric data match, based on the value of said second matching score relative to a second threshold value.

In one embodiment, comparing said image of a body region with a group of reference biometric data using said truth map comprises:

calculating a third matching score between said image of a body region and said group of reference biometric data, without using the truth map;

determining if said image of a body region and said group of reference biometric data match, based on the value of said third matching score relative to a third threshold value, and if said image of a body region matches said group of reference biometric data, verifying said match using said truth map.

In one embodiment, verifying said match using said truth map comprises:

calculating a fourth matching score between said image of a body region and said group of reference biometric data, only taking into account data which belongs to regions of the image of a body region which are considered to be true in the truth map; and determining if said image of a body region and said group of reference biometric data match, based on the value of said fourth matching score relative to a fourth threshold value.

In one embodiment, verifying said match using said truth map comprises:

calculating a fifth matching score between said image of a body region and said group of reference biometric data, only taking into account data which belongs to regions of the image of a body region which are considered to be true in the truth map;

calculating a sixth matching score between said image of a body region and said group of reference biometric data, only taking into account data which belongs to regions of the image of a body region which are considered not to be true in the truth map;

determining that said image of a body region and said group of reference biometric data match if the absolute value of the difference between said fifth score and said sixth score is less than a fifth threshold value.

In one embodiment, verifying said match using said truth map comprises:

calculating a seventh matching score between said image of a body region and said group of reference biometric data, weighting the data with the value associated therewith in the truth map;

determining if said image of a body region and said group of reference biometric data match, based on the value of said seventh matching score relative to a sixth threshold value.

In one embodiment, comparing said image of a body region with a group of reference biometric data using said truth map comprises matching local elements, and wherein verifying said match using said truth map comprises:

determining a number of matched local elements considered to be true in the truth map; and determining that said image of a body region and said group of reference biometric data match if said number is greater than an eighth threshold value.

At least one embodiment relates to a device for biometric identification or authentication comprising at least one processor configured for:

obtaining an image of a body region;

obtaining a truth map for said body region, said truth map associating, with each portion of a set of portions of said image of a body region, a value equal to a probability that said portion belongs to a true body region;

comparing said image of a body region with a group of reference biometric data using said truth map;

validating or invalidating the identification or the authentication of said body region in response to said comparison.

At least one embodiment relates to a computer program product, characterized in that it comprises instructions for implementing, by a processor, the method according to any one of the preceding embodiments, when said program is executed by said processor.

At least one embodiment relates to a storage medium, characterized in that it stores a computer program comprising instructions for implementing, by a processor, the method according to any one of the preceding embodiments, when said program is executed by said processor.

BRIEF DESCRIPTION OF THE DRAWINGS

The aforementioned features of the invention, as well as other features, will become more clearly apparent from reading the following description of an exemplary embodiment, with said description being provided with reference to the accompanying drawings, in which:

FIG. 1 shows a fingerprint partially covered with a spoof;

FIG. 2 shows a method for validating identification or authentication according to a particular embodiment;

FIG. 3 shows in detail a step of obtaining a truth map according to a particular embodiment, in the case in which the body part is a fingerprint;

FIG. 4 shows in detail a step of comparing an image of a body region with at least one group of reference biometric data according to a first particular embodiment;

FIG. 5 shows in detail a step of comparing an image of a body region with at least one group of reference biometric data according to a second particular embodiment;

FIG. 6 shows in detail a step of comparing an image of a body region with at least one group of reference biometric data according to a third particular embodiment, and FIG. 7 schematically shows an example of hardware architecture of a device for identification or authentication according to a particular embodiment.

DETAILED DISCLOSURE OF EMBODIMENTS

In the embodiments described, only the term "identification" is used. However, the embodiments described apply identically to authentication. Thus, the reference biometric data may be stored in a database, in the case of an identification, or else reproduced on an official document (for example, a passport) in the case of an authentication. Conventionally, the reference biometric data stored in the database were extracted beforehand from reference images of body parts, each belonging to a particular individual. These are commonly local elements such as minutiae on a fingerprint. Storing reference biometric data instead of reference images is less expensive, since the reference biometric data is extracted only once and for all. Further, this reference biometric data requires less memory space for storage thereof than the reference images from which it was extracted. Hereinafter, a group of reference biometric data is defined as all of the biometric data extracted from an image of a body part belonging to a given individual. Thus, the database comprises a plurality of groups of biometric data (for example, of minutiae), each group of data being associated with a particular individual. A group of biometric data comprises at least one item of biometric data.

FIG. 1 shows a fingerprint 10 partially covered with a spoof 12. The aim of the spoof 12 is to mislead the identification devices. The spoof 12 is for example a thin film which reproduces a fingerprint stored in a database or on an official document. The aim of the fingerprint part corresponding to a true finger 10, if it does not reproduce a fingerprint known from the database, is to mislead the devices for validating the veracity of the body parts.

Since the identification, and the validation thereof, are two steps which are conventionally applied sequentially, the fingerprint of FIG. 1 enables identification by virtue of the spoof, said identification being validated by virtue of the part which matches a true finger. The same method can be applied to other body parts, such as a true face which is partially covered by a mask reproducing another face, from which a group of reference biometric data has been extracted and is stored in a database with a view to an identification. Thus, an identification is possible by virtue of the mask, said identification being validated by virtue of the part corresponding to the true face.

FIG. 2 shows a method for biometric identification or authentication according to a particular embodiment.

During a step S20, an image of a body region is obtained. This image can be acquired directly by a camera or else by a biometry-specific sensor, such as a contact-based or contactless fingerprint sensor. The image of the body region can also be obtained indirectly, for example from data acquired by virtue of an OCT ("Optical Coherence Tomography") or ultrasound sensor. The OCT is a contactless optical sensor using an interferometric technique, which makes it possible to image light-scattering elements in 3 dimensions. In the remainder of the document, the various embodiments are described for a 2D image of a body region. However, the different embodiments also apply to a three-dimensional image or to the combination of a textured image and a three-dimensional image. For example, a distance map (z-map) can be used rather than the image of the body region. A distance map is an image in which the value of each pixel represents the distance thereof relative to the camera.

During a step S22, a truth map associated with the body region is obtained. The truth map thus associates, with each portion of a plurality of portions of the image of the body region, a value representative of the true nature of said portion. A portion can be a pixel or a group of pixels. In a particular embodiment, the truth map associates, with each pixel of the image of the body region, a value representative of the true nature of said pixel.

The truth map can be binary, in which case the associated value is equal to a first value (for example, 0) if the portion is considered to belong to a true body part, and a second value (for example, 1) if the portion is considered to belong to a spoof or an imitation. In another variant, the truth map is ternary, i.e. the associated value is equal to a first value (for example, 0) if the portion is considered to belong to a true body part, a second value (for example, 1) if the portion is considered to belong to a spoof/to an imitation, and a third value (for example, 2) if there is uncertainty as to the nature of said portion. In another variant, the truth map associates, with each portion, a value representative of a probability that the portion belongs to a true body part and not to a spoof.

FIG. 3 shows in detail step S22 of the validation method according to a particular embodiment, in the case in which the body part is a fingerprint. The truth map is for example obtained by applying the method described in the document by Chugh et al., entitled *"Fingerprint spoof buster: Use of minutiae-centered patches"*, published in 2018 in IEEE Transaction on information Forensics and security. The proposed method uses a neural network of CNN type ("Convolutional Neural Network"), known by the name MobileNet. The fingerprint is introduced at the input of the previously trained neural network, i.e. for which the weights are known, in order to obtain a score per patch around one minutia, said score being representative of the probability that said patch belongs to a true finger. A minutia is a particular point located at a continuity change in fingerprint ridges (for example, a bifurcation or line termination).

During a step S220, k minutiae are extracted from the fingerprint, each minutia being represented by a set of parameters (for example, spatial coordinates, orientation, etc.), k being a positive integer. The extraction of minutiae generally comprises filtering the image (for example, increasing contrast, reducing noise) in order to make as much useful information as possible stand out, skeletonization of the filtered image in order to obtain a black and white image from which the minutiae are extracted.

During a step S222, k local patches are extracted, each of the patches being a block of pixels (for example, 136×136 pixels) centered on one of the k minutiae.

During a step S224, each patch is aligned by rotation based on the orientation associated with the minutia on which it is centered. After the alignment, a smaller patch (for example, 96×96 pixels in size), referred to as sub-patch, is extracted from the aligned patch.

During a step S226, the k patches extracted are provided at the input of the trained neural network in order to obtain a truth score for each patch. The truth map associates, for example with each pixel of the patch, the value of the score of the patch.

If the body part is a face, the truth map is for example obtained by applying the method described in patent application WO2014/198847.

The surface of the face is illuminated so as to generate stippling on said surface. To this end, the surface is illuminated by an incident coherent stream polarized in a polarization direction and having a coherence of greater than or equal to 1 cm. An image of the stippling is then obtained by capturing a stream reflected on the surface and scattered by the surface. The value of at least one criterion (for example, standard deviation of the intensities) representative of the stippling is calculated from the image obtained. The value thus calculated is compared to a range of permissible reference values for a true face. If the calculated value belongs to said range, then the face is considered to be a true face, otherwise the face is considered to be a spoof. For example, if the standard deviation of the intensities of the image is outside the expected range, then the face is not considered to be a true face.

In order to obtain local values for the truth map, the image is divided into blocks of pixels and a value of at least one representative criterion is calculated per block of pixels. Thus, a decision can be made for each block, indicating whether or not said block belongs to a true face. In this case, the truth map is binary.

Alternatively, for each pixel of the image, a vicinity of this pixel is considered to calculate the value of the criterion associated with this pixel.

In a variant embodiment, the truth map is for example obtained by applying the method described in the document by Deb et al., entitled *"Look Locally Infer Globally: A Generalizable Face Anti-Spoofing Approach"* published in 2020 in IEEE Transactions on Information Forensics and Security, 16, 1143-1157. This method makes it possible to obtain truth maps constructed by a convolutional neural network from images of faces.

If the body part is an iris, the truth map is for example obtained from an image of the iris captured in the visible spectrum and an image of the iris captured in the infrared spectrum by applying the method described in patent application FR3053500. In order to obtain local values for the truth map, the image is divided into blocks of pixels and a value is calculated per block. Thus, a decision can be made for each block, indicating whether or not said block belongs to a true iris. Alternatively, for each pixel of the image, a vicinity of this pixel is considered to calculate the value of the criterion associated with this pixel. In this case, the truth map is binary.

Again with reference to FIG. 2, during a step S24, the image of the body region obtained in step S20 is compared to at least one current group of reference biometric data, taking into account the truth map obtained in step S22. The reference biometric data is for example stored in a database or reproduced on an official document (for example, a passport). The comparison makes it possible to determine whether or not the image obtained in step S20 belongs to a person referenced in the database (identification) or whether the person is indeed who they claim to be (authentication). The comparison generally comprises the calculation of a score representative of the match between biometric data extracted from the image of the body region obtained in step S20 and reference biometric data and the comparison of this score with a threshold value. The calculation of a score representative of the match comprises for example a matching of local elements in the images (for example, such as minutiae in the case of fingerprint images). If the image of the body region obtained in step S20 matches the current group of reference biometric data (for example, the score calculated is greater than a threshold), then during a step S26 the identification is validated; otherwise, it is invalidated. In the latter case, an alarm can be triggered (for example, emission of a visible or audible alarm) to indicate attempted fraud.

In the case of a database with a plurality of groups of biometric data, with each group corresponding to a particular individual, if the image of the body region obtained in step S20 does not match the current group of reference biometric data, step S24 is repeated with a new group of reference biometric data which belongs to another individual, either until all the groups of reference biometric data have been compared to the image of the body region obtained in step S20, or until a group of reference biometric data, and hence an individual, is found which matches the image of the body region obtained in step S20.

FIG. 4 shows in detail step S24 of the validation method according to a particular embodiment.

During a step S240, a matching score S1 between the image of the body region obtained in step S20 and at least one current group of reference biometric data is calculated without using the truth image. This calculation of the score comprises for example a matching of local elements in the images (for example such as minutiae in the case of fingerprint images) and the calculation of a score representative of the match, for example, of the similarity, between these local elements. Hereinafter, this score is referred to as matching score. From this matching score, it is deduced whether or not the image of the body region obtained in step S20 matches the current group of reference biometric data.

Thus, during a step S242, the method determines if said image of a body region and the current group of reference biometric data match, based on the value of said matching score relative to a threshold value.

Steps S240 and S242 depend on the body part in question.

This mode of implementation makes it possible to calculate the matching score S1 using a biometric comparison algorithm from the prior art, which does not take into account the truth map, and thus makes it possible to use an existing system to carry out steps S240 and S242. This is particularly advantageous for systems comprising numerous groups of reference biometric data, the latter using suitable biometric comparison algorithms.

In the particular case of a fingerprint, the calculation of a matching score comprises matching particular points, for example, minutiae. Each minutia is represented by a set of parameters (for example, coordinates, orientation, etc.). For example, with 15 to 20 correctly located minutiae, it is possible to identify a fingerprint from among several million examples. In a variant embodiment, other information is used in addition to, or instead of, minutiae, for example a general pattern of the print or more complex information such as the shape of the fingerprint ridges. The extraction of the minutiae with their parameters generally comprises filtering the image (for example, increasing contrast, reducing noise) in order to make as much useful information as possible stand out, skeletonization of the filtered image in order to obtain a black and white image from which the minutiae are extracted. In order to determine whether the fingerprint obtained in step S20 belongs to a person P for whom a group of reference minutiae is stored in a database, the minutiae associated with the fingerprint obtained in step S20 are compared with the group of reference minutiae stored in the database. The minutiae associated with a fingerprint define a scatter plot. Thus, a comparison between two fingerprints is substantially a comparison between two scatter plots. A matching score is a score which estimates the extent to which these two scatter plots are superimposed. If the two scatter plots are similar, then the score is high, i.e. greater than a threshold TH1; otherwise, the score is low. If the score is high, then the fingerprints are similar, i.e. they match, and it can be concluded therefrom that the fingerprints belong to the same individual P.

As an alternative to minutiae, other characteristic points can be used. Document FR3037422 proposes using points of interest associated with local descriptors. The points of interest may be local extrema of the image, and the descriptors may be selected from the following: SIFT, SURF, Orb, Kaze, Aka-ze, Brisk, etc. The comparison of two images consists in bringing together a group of points of interest extracted from the image obtained in step S20 wand a group of reference points of interest such that the descriptors match pairwise and that the geometrical constraints on the position of the points are complied with. As with minutiae, the comparison consists in matching scatter plots. The invention is therefore applied identically.

In the particular case of a face, the calculation of a matching score comprises determining descriptor vectors. Thus, the descriptors are extracted from the image of the face obtained in step S20 in the form of a vector. Facial recognition can be carried out in two dimensions when it uses the shape and measurements of elements of the face (eyes, nose, etc.) or in three dimensions when several angles of the face are used (front-on, profile, three-quarters, etc.) to compose the model from photos or a video recording. In other embodiments, a principal component analysis makes it possible to extract such a descriptor vector from an image of a face. In a variant embodiment, the face in the image obtained in step S20 is recentered and normalized, for example, using the position of the two eyes. The image with the recentered and normalized face is subsequently introduced as input to a pre-trained neural network which provides said descriptor vector as output.

In order to determine whether the image of the face obtained in step S20 belongs to a person for whom a group of biometric data is stored in a database, the vector V of descriptors associated with the image of the face obtained in step S20 is compared with a reference vector of descriptors stored in the database. A matching score is a score which estimates the extent to which these two vectors are similar. The matching score is for example a scalar product of the two vectors (the latter may be normalized beforehand, if necessary). If the two vectors are similar, then the score is high/close to 1, i.e. greater than a threshold TH2; otherwise, the score is low. If the score is close to 1, then the faces are similar, i.e. they match, and it can be concluded therefrom that the faces belong to the same individual.

In the particular case of an iris, the comparison comprises matching local elements; in this instance, rings or portions of rings of the iris. Patent application FR3037422 describes such a matching method. The method comprises the following steps:
  segmenting the image of an eye so as to isolate a region containing the texture of the iris and to determine an associated mask;
  dividing said region containing the iris texture and said mask into N2 concentric rings,
  normalizing said region containing the iris texture and said mask of Cartesian coordinates into polar coordinates;
  determining a binary iris code IC of size equal to N2*P*F coding said region containing the iris texture and a binary mask code IM of size equal to N2*P*F coding the associated mask; said codes being determined by applying F Gabor filters at each position from P positions for each ring,
  matching, for example, with a Viterbi algorithm, at least one ring of the iris of the acquired image with a ring of a reference iris so as to minimize a matching distance DM between the acquired image and the reference biometric data, said matching distance being obtained from determined iris codes and stored reference iris codes and the associated mask codes by calculating a sum of distances between each of said rings of the iris from the matched acquired image and the ring of the reference iris which matches therewith. The matching score S1 is then equal to the inverse of the matching distance calculated, or the matching score is equal to (1-DM).

If the irises are similar, then the matching score is high, i.e. greater than a threshold TH3, otherwise, the score is low. If the score is high, then the irises are similar, i.e. they match, and it can be concluded therefrom that the irises belong to the same individual.

Again with reference to FIG. 4, if at least one group of reference biometric data matches the image of the body region (step S242), then the method continues on to a step S244, otherwise, the identification is not validated (26-2), since the body region obtained does not match any group of reference biometric data. In the latter case, an alarm can be triggered (for example, emission of a visible or audible alarm) to indicate attempted fraud.

In step S244, the identification carried out in step S242 is verified. To this end, the information provided by the truth map is used to validate or invalidate the identification.

In a first embodiment, a new matching score S2 is calculated in the same way as in step S240, but only taking into account data which belongs to regions of the image which are considered to be true in the truth map. Since a group of reference biometric data has already been identified, this additional step is relatively inexpensive in terms of computing power. If the truth map associates, with each image portion, a value representative of a probability that the portion belongs to a true body part and not to a spoof, it can be thresholded in order to indicate the regions of the image which are considered to be true. The threshold used is selected so as to take into account, in the calculation of the new matching score, the regions of the image for which there is some uncertainty (probability close to 0.5). For example, the threshold is equal to 0.6.

This new matching score S2 is compared to a threshold, for example, equal to the same threshold as that used in step S240 or a different one, for example one which is slightly lower. For example, in the case of a fingerprint, only the minutiae belonging to patches which are considered to be true are taken into account in the calculation of this new matching score S2. If this new matching score S2 is greater than a threshold value TH1' then the identification is validated (S26-1), otherwise, the identification is invalidated (S26-2). In the latter case, an alarm (for example, a visible or audible signal) can be triggered (for example emission of a visible or audible alarm) to indicate attempted fraud. Indeed, in the case of fraud, as shown in FIG. 1, the true part of the print does not match the reference biometric data. In one embodiment, TH1' is equal to TH1. In a variant, TH1' is slightly less than TH1. For example, TH1'=α*TH1 with α=0.95.

In a variant embodiment, a new matching score S3 is obtained in the same way as the score S2, but only taking into account pixels which belong to regions of the image which are considered not to be true in the truth map. If S1 is greater than TH1, S2 less than TH1' and S3 greater than a threshold value TH1", then the identification is invalidated and an alarm may be triggered.

If S1 is greater than TH1, S2 less than TH1' and S3 less than TH1", then the identification is validated or invalidated depending on the level of security required for the system. For example, the identification is validated in the event of a standard security access check and invalidated in the event of a check in a high-security zone or a check with a view to payment of a large sum. In one embodiment, TH1" is equal to TH1. In a variant, TH1" is slightly less than TH1. For example, TH1"=β*TH1 with β=0.98.

In the case of the face, a new descriptor vector is calculated for the image obtained in step S20, only taking into account pixels which belong to regions of the image which are considered to be true in the truth map. This new vector is compared to that of the group of reference biometric data in the same way as in step S240. A new matching score S2 is thus obtained. If this new matching score S2 is greater than a threshold value TH2' then the identification is validated (S26-1); otherwise, the identification is invalidated (S26-2). In the latter case, an alarm (for example, a visible or audible signal) can be triggered (for example, emission of a visible or audible alarm) to indicate attempted fraud. In one embodiment, TH2' is equal to TH2. In a variant, TH2' is slightly less than TH2. For example, TH2'=α*TH2 with α=0.95.

In a variant embodiment, a new matching score S3 is obtained in the same way as the score S2, but only taking into account pixels which belong to regions of the image which are considered not to be true in the truth map. If S1 is greater than TH2, S2 less than TH2' and S3 greater than a threshold value TH2", then the identification is invalidated and an alarm may be triggered.

If S1 is greater than TH2, S2 less than TH2' and S3 less than TH2", then the identification is validated or invalidated depending on the level of security required for the system. For example, the identification is validated in the event of a standard security access check and invalidated in the event of a check in a high-security zone or a check with a view to payment of a large sum. In one embodiment, TH2" is equal to TH2. In a variant, TH2" is slightly less than TH2. For example, TH2"=β*TH2 with β=0.98.

In the case of an iris, the same geometric transformations applied to obtain the binary codes are applied to the truth map in order to obtain a truth value for each binary code. Only those binary codes having a truth value greater than a threshold, for example, 0.5, are taken into account in the calculation of the new matching score S2. If this new score S2 is greater than a threshold value TH3' then the identification is validated (S26-1), otherwise, the identification is invalidated (S26-2). In the latter case, an alarm (for example, a visible or audible signal) can be triggered (for example, emission of a visible or audible alarm) to indicate attempted fraud. In one embodiment, TH3' is equal to TH3. In a variant, TH3' is slightly less than TH3. For example, TH3'=α*TH3 with α=0.95.

In a variant embodiment, a new matching score S3 is obtained in the same way as the score S2, but only taking into account pixels which belong to regions of the image which are considered not to be true in the truth map. If S1 is greater than TH3, S2 less than TH3' and S3 greater than a threshold value TH3", then the identification is invalidated and an alarm may be triggered.

If S1 is greater than TH3, S2 less than TH3' and S3 less than TH3", then the identification is validated or invalidated depending on the level of security required for the system. For example, the identification is validated in the event of a standard security access check and invalidated in the event of a check in a high-security zone or a check with a view to payment of a large sum. In one embodiment, TH3" is equal to TH3. In a variant, TH3" is slightly less than TH3. For example, TH3"=β*TH3 with β=0.98.

In a second embodiment, a new matching score S4 is calculated in the same way as in step S242, taking into account all the data but weighting it with the value associated therewith in the truth map. For example, in the case of a fingerprint, the score is calculated by giving greater importance to the points (for example, minutiae) which belong to true body regions. The score associated with each minutia is for example, weighted with an increasing function, for example, a sigmoid, based on the probability of being true.

For example, $$S4 = \frac{1}{NbMin} = \sum_{n=1}^{NbMin} ScCoor(n) * \frac{ProbVrai(n)}{ProbaNeutre}$$

where NbMin is the number of minutiae, ScCoor(n) is a local matching score calculated for a given minutia of index n, ProbVrai(n) is the probability that the minutia of index n belongs to a true region, and ProbaNeutre is for example, equal to 0.6.

If this new score is greater than a threshold value (for example, TH1) then the identification is validated (S26-1), otherwise, the identification is invalidated (S26-2) and where appropriate an alarm (for example, a visible or audible signal) is triggered (for example, emission of a visible or audible alarm) to indicate attempted fraud.

In a third embodiment, two new scores are calculated: one which only takes into account data considered to be true, and one which only takes into account data considered not to be true. If these two scores are very different, for example, the absolute value of their difference is greater than a threshold, then the identification is invalidated. If the truth map is ternary, the uncertain pixels are not taken into account, or are taken into account for both comparisons. This embodiment is preferentially used when the surfaces labeled as true and as not true have a minimal size, for example when at least 20% of the total surface area is considered to be true and at least 20% of the total surface area is considered not to be true.

For example, in the case of the face, a first descriptor vector is calculated only taking into account pixels which belong to regions of the image which are considered to be true in the truth map. A second descriptor vector is calculated only taking into account pixels which belong to regions of the image which are considered not to be true in the truth map. The two descriptor vectors are then compared with one another. If they are very different, for example, a scalar product between the two vectors is greater than a threshold, then the identification is invalidated (S26-2); otherwise, it is validated (S26-1). If the identification is invalidated, an alarm (for example, a visible or audible signal) can be triggered (for example, emission of a visible or audible alarm) to indicate attempted fraud.

In a fourth embodiment, in the case of matching from local elements, for example, matching of points of minutiae type, the matched number of points considered to be true, for example, belonging to true patches, is determined. If this number is greater than a threshold, then the identification is validated; otherwise, it is invalidated. In the latter case, an alarm (for example, a visible or audible signal) can be triggered (for example, emission of a visible or audible alarm) to indicate attempted fraud.

In a variant embodiment, each time a new group of reference biometric data is stored in a database, the associated truth map is also stored. The matching score is weighted by the product of the truth values associated with the matched elements. Thus, the associations between two true items of data are considered to be true whereas the associations in which at least one of the two items of data is considered to be not true are considered to be not true.

In another embodiment, steps S240 and S244 are carried out in one and the same step. Thus, the truth map is used during step S240 to weight the calculation of the matching score.

The method described is robust to fraud attempts. Indeed, since the information relating to truth is taken into account in the calculation of the matching score either from the start or a second time round, fraud attempts are detected. The method advantageously makes it possible to identify an individual even if the body part used is degraded. Indeed, conventional methods which are robust to fraud will tend to invalidate the identification if a body part is degraded, whereas the present method, while remaining robust to fraud, will validate the identification if a body part is degraded, by virtue of the body part being identified as true in the truth map.

FIG. 5 shows in detail step S24 of the validation method according to another particular embodiment.

During a step S250, a matching score between the image of a body region obtained in step S20 and at least one group of current reference biometric data is calculated, only taking into account data which belongs to regions of the image of a body region which are considered to be true in the truth map. From this matching score, it is deduced whether or not the image of the body region obtained in step S20 matches the current group of reference biometric data.

Thus, during a step S252, the method determines if said image of a body region and the group of reference biometric data match, based on the value of said matching score relative to a threshold value.

Steps S250 and S252 depend on the body part in question. The different embodiments described in conjunction with FIG. 4 for steps S240 and S244 apply, the only difference being that, during step S250, only data which belongs to regions of the image of a body region which are considered to be true in the truth map is taken into account.

FIG. 6 shows in detail step S24 of the validation method according to another particular embodiment.

During a step S260, a matching score between the image of the body region obtained in step S20 and at least one current group of reference biometric data is calculated by weighting the data with the value associated therewith in the truth map. From this matching score, it is deduced whether or not the image of the body region obtained in step S20 matches the current group of reference biometric data.

Thus, during a step S262, the method determines if said image of a body region and the group of reference biometric data match, based on the value of said matching score relative to a threshold value.

Steps S260 and S262 depend on the body part in question. The different embodiments described in conjunction with FIG. 4 for steps S240 and S244 apply, the only difference being that, during step S260, the data is weighted.

FIG. 7 schematically shows an example of hardware architecture of a device 140 for identification or authentication according to a particular embodiment. According to the example of hardware architecture shown in FIG. 7, the device 140 thus comprises, connected by a communication bus 1400: a processor or CPU (Central Processing Unit) 1401; a RAM (Random Access Memory) 1402; a ROM (Read Only Memory) 1403; a storage unit 1404 such as a hard drive or a storage medium reader, for example, an SD (Secure Digital) card reader; at least one communication interface 1405, enabling the device 140 to send or receive information.

The processor 1401 is capable of executing instructions loaded into the RAM 1402 from the ROM 1403, from an external memory (not shown), from a storage medium (such as an SD card), or from a communication network. When the device 140 is turned on, the processor 1401 is capable of reading instructions from the RAM 1402 and of executing them. These instructions form a computer program causing the implementation, by the processor 1401, of all or some of the methods described with reference to FIGS. 2 to 6.

The methods described in relation to FIGS. 2 to 6 may be implemented in software form by executing a set of instructions using a programmable machine, for example, a DSP (Digital Signal Processor) or a microcontroller, or be implemented in hardware form by a machine or a dedicated component, for example, an FPGA (Field-Programmable Gate Array) or an ASIC (Application-Specific Integrated Circuit). In general, the device 140 comprises electronic circuitry configured to implement the methods described in relation to FIGS. 2 to 6.

The invention claimed is:

1. A method for biometric identification or authentication, comprising:
obtaining an image of a body region;
obtaining a truth map for said body region, said truth map associating, with each portion of a set of portions of said image of a body region, a value equal to a probability that said portion belongs to a true body region;
comparing said image of a body region with a group of reference biometric data using said truth map;
validating or invalidating the identification or the authentication of said body region in response to said comparison;
wherein said comparing said image of a body region with a group of reference biometric data using said truth map comprises:
selecting regions of the image of a body region, wherein the selected regions are considered to be true in the truth map;
calculating a matching score between said selected regions and said group of reference biometric data; and
determining if said image of a body region and said group of reference biometric data match, based on the value of said matching score relative to a threshold value.

2. A method for biometric identification or authentication, comprising:
obtaining an image of a body region;
obtaining a truth map for said body region, said truth map associating, with each portion of a set of portions of said image of a body region, a value equal to a probability that said portion belongs to a true body region;
comparing said image of a body region with a group of reference biometric data using said truth map;
validating or invalidating the identification or the authentication of said body region in response to said comparison;
wherein said comparing said image of a body region with a group of reference biometric data using said truth map comprises:
weighting regions of the image of a body region with the value associated therewith in the truth map;
calculating a matching score between said weighted regions and said group of reference biometric data; and
determining if said image of a body region and said group of reference biometric data match, based on the value of said matching score relative to a threshold value.

3. A method for biometric identification or authentication, comprising:
obtaining an image of a body region;
obtaining a truth map for said body region, said truth map associating, with each portion of a set of portions of said image of a body region, a value equal to a probability that said portion belongs to a true body region;
comparing said image of a body region with a group of reference biometric data using said truth map;
validating or invalidating the identification or the authentication of said body region in response to said comparison;
wherein said comparing said image of a body region with a group of reference biometric data using said truth map comprises:
calculating a first matching score between said image of a body region and said group of reference biometric data, without using the truth map;
determining if said image of a body region and said group of reference biometric data match, based on the value of said first matching score relative to a first threshold value; and, if said image of a body region matches said group of reference biometric data, verifying said match using said truth map.

4. The method according to claim 3, wherein said verifying said match using said truth map comprises:
selecting regions of the image of a body region, wherein the selected regions are considered to be true in the truth map;
calculating a second matching score between said selected regions and said group of reference biometric data; and
determining if said image of a body region and said group of reference biometric data match, based on the value of said second matching score relative to a second threshold value.

5. The method according to claim 3, wherein said verifying said match using said truth map comprises:
selecting first regions of the image of a body region, wherein the selected first regions are considered to be true in the truth map;
calculating a second matching score between said selected first regions and said group of reference biometric data;
selecting second regions of the image of a body region, wherein the selected second regions are considered not to be true in the truth map;
calculating a third matching score between said selected second regions and said group of reference biometric data;
determining that said image of a body region and said group of reference biometric data match if the absolute value of the difference between said second matching score and said third matching score is less than a third threshold value.

6. The method according to claim 3, wherein said verifying said match using said truth map comprises:
weighting regions of the image of a body region with the value associated therewith in the truth map;
calculating a second matching score between said weighted regions and said group of reference biometric data;
determining if said image of a body region and said group of reference biometric data match, based on the value of said second matching score relative to a second threshold value.

7. The method according to claim 3, wherein said comparing said image of a body region with a group of reference biometric data using said truth map comprises matching local elements, and wherein said verifying said match using said truth map comprises:
determining a number of matched local elements considered to be true in the truth map; and
determining that said image of a body region and said group of reference biometric data match if said number is greater than a second threshold value.

8. A device for biometric identification or authentication comprising at least one processor configured for implementing a method for biometric identification or authentication, comprising:
obtaining an image of a body region;
obtaining a truth map for said body region, said truth map associating, with each portion of a set of portions of said image of a body region, a value equal to a probability that said portion belongs to a true body region;
comparing said image of a body region with a group of reference biometric data using said truth map;
validating or invalidating the identification or the authentication of said body region in response to said comparison;
wherein said comparing said image of a body region with a group of reference biometric data using said truth map comprises:
selecting regions of the image of a body region, wherein the selected regions are considered to be true in the truth map;
calculating a matching score between said selected regions and said group of reference biometric data; and
determining if said image of a body region and said group of reference biometric data match, based on the value of said matching score relative to a threshold value.

9. A device for biometric identification or authentication comprising at least one processor configured for implementing a method for biometric identification or authentication, comprising:
obtaining an image of a body region;
obtaining a truth map for said body region, said truth map associating, with each portion of a set of portions of said image of a body region, a value equal to a probability that said portion belongs to a true body region;
comparing said image of a body region with a group of reference biometric data using said truth map;
validating or invalidating the identification or the authentication of said body region in response to said comparison;
wherein said comparing said image of a body region with a group of reference biometric data using said truth map comprises:
weighting regions of the image of a body region with the value associated therewith in the truth map;
calculating a matching score between said weighted regions and said group of reference biometric data; and
determining if said image of a body region and said group of reference biometric data match, based on the value of said matching score relative to a threshold value.

10. A device for biometric identification or authentication comprising at least one processor configured for implementing a method for biometric identification or authentication, comprising:
obtaining an image of a body region;
obtaining a truth map for said body region, said truth map associating, with each portion of a set of portions of said image of a body region, a value equal to a probability that said portion belongs to a true body region;
comparing said image of a body region with a group of reference biometric data using said truth map;
validating or invalidating the identification or the authentication of said body region in response to said comparison;
wherein said comparing said image of a body region with a group of reference biometric data using said truth map comprises:
calculating a first matching score between said image of a body region and said group of reference biometric data, without using the truth map;
determining if said image of a body region and said group of reference biometric data match, based on the value of said first matching score relative to a first threshold value; and, if said image of a body region matches said group of reference biometric data, verifying said match using said truth map.

\* \* \* \* \*